(12) United States Patent
Gu et al.

(10) Patent No.: US 11,613,498 B2
(45) Date of Patent: Mar. 28, 2023

(54) COATED GLASSES WITH HIGH EFFECTIVE FRACTURE TOUGHNESS

(71) Applicant: CORNING INCORPORATED, Corning, NY (US)

(72) Inventors: Yunfeng Gu, Painted Post, NY (US); Jian Luo, Painted Post, NY (US); Weijun Niu, Painted Post, NY (US); Rui Zhang, Elmira, NY (US)

(73) Assignee: Corning Incorporated, Corning, NY (US)

( * ) Notice: Subject to any disclaimer, the term of this patent is extended or adjusted under 35 U.S.C. 154(b) by 349 days.

(21) Appl. No.: 16/991,457

(22) Filed: Aug. 12, 2020

(65) Prior Publication Data

US 2022/0048812 A1 Feb. 17, 2022

Related U.S. Application Data

(60) Provisional application No. 62/885,505, filed on Aug. 12, 2019.

(51) Int. Cl.
*C03C 17/32* (2006.01)
*C03C 3/085* (2006.01)
*C03C 17/00* (2006.01)

(52) U.S. Cl.
CPC .............. *C03C 17/32* (2013.01); *C03C 3/085* (2013.01); *C03C 17/001* (2013.01); *C03C 2217/70* (2013.01); *C03C 2218/114* (2013.01); *C03C 2218/365* (2013.01)

(58) Field of Classification Search
CPC ....... C03C 17/32; C03C 17/001; C03C 3/085; C03C 2217/70; C03C 2218/114; C03C 2218/365

USPC ......................................................... 428/210
See application file for complete search history.

(56) References Cited

U.S. PATENT DOCUMENTS

| 8,312,739 B2 | 11/2012 | Lee et al. |
| 8,561,429 B2 | 10/2013 | Allan et al. |
| 9,272,946 B2 | 3/2016 | Chang et al. |
| 9,399,593 B2 | 7/2016 | Abramov et al. |

(Continued)

FOREIGN PATENT DOCUMENTS

| EP | 3330235 A1 | 6/2018 |
| JP | 2014-152327 A | 8/2014 |
| WO | 2019/100049 A1 | 5/2019 |

OTHER PUBLICATIONS

International Search Report and Written Opinion of the International Searching Authority; PCT/US2020/044832; dated Nov. 23, 2020; 10 pages; European Patent Office.

(Continued)

*Primary Examiner* — Betelhem Shewareged
(74) *Attorney, Agent, or Firm* — Jeffrey A. Schmidt

(57) ABSTRACT

Glass-based articles comprise high effective fracture toughness. Glass-based articles comprise: a glass-based substrate comprising opposing first and second surfaces defining a substrate thickness ($t_s$), a substantially planar central portion, and a perimeter portion; a polymer coating disposed on at least a portion of at least one of the first or the second surfaces; and an effective fracture toughness that is greater than or equal to 1.25 MPa·m$^{0.5}$ as measured at room temperature.

20 Claims, 4 Drawing Sheets

(56) References Cited

U.S. PATENT DOCUMENTS

| | | |
|---|---|---|
| 9,428,302 B2 | 8/2016 | Fadeev et al. |
| 10,633,279 B2 | 4/2020 | Gross et al. |
| 2016/0264457 A1 | 9/2016 | Liang |
| 2016/0318796 A1* | 11/2016 | Masuda ................ C03C 17/32 |
| 2019/0161386 A1 | 5/2019 | Gross et al. |
| 2020/0283326 A1 | 9/2020 | Fekety et al. |
| 2022/0048812 A1* | 2/2022 | Gu ......................... C03C 3/085 |

OTHER PUBLICATIONS

Salem et al; "Fracture Toughness of Thin Plates by the Double-Torsion Test Method"; Submitted to Ceramic Engineering and Science Proceedings, 2006 (10 pages).

\* cited by examiner

COATED GLASSES WITH HIGH EFFECTIVE FRACTURE TOUGHNESS

CROSS-REFERENCE TO RELATED APPLICATION

This application claims the benefit of priority under 35 U.S.C. § 119 of U.S. Provisional Application Ser. No. 62/885,505 filed on Aug. 12, 2019, the content of which is relied upon and incorporated herein by reference in its entirety.

FIELD

The present specification generally relates to increasing fracture toughness of glass articles by applying a polymer coating to glass substrates.

TECHNICAL BACKGROUND

The mobile nature of portable devices, for example smart phones, tablets, portable media players, personal computers, and cameras, makes these devices particularly vulnerable to accidental dropping on hard surfaces, for example the ground. These devices typically incorporate cover glasses, which may become damaged upon impact with hard surfaces. In many of these devices, the cover glasses function as display covers, and may incorporate touch functionality, such that use of the devices is negatively impacted when the cover glasses are damaged.

There are two major failure modes of cover glass when the associated portable device is dropped on a hard surface. One of the modes is flexure failure, which is caused by bending of the glass when the device is subjected to dynamic load from impact with the hard surface. The other mode is sharp contact failure, which is caused by introduction of damage to the glass surface. Impact of the glass with rough hard surfaces, for example asphalt, granite, etc., can result in sharp indentations in the glass surface. These indentations become failure sites in the glass surface from which cracks may develop and propagate.

It has been a continuous effort for glass makers and handheld device manufacturers to improve the resistance of handheld devices to failure. Accordingly, a need exists for glasses that provide high effective fracture toughness.

SUMMARY

Aspects of the disclosure pertain to glass-based articles and methods for their manufacture and use. Glass-based articles herein exhibit high effective fracture toughness ($K_C$). Various features of the present disclosure may be combined in any and all combinations, for example, as according to the following embodiments Embodiment 1. A glass-based article comprising:
a glass-based substrate comprising opposing first and second surfaces defining a substrate thickness ($t_s$), a substantially planar central portion, and a perimeter portion;
a polymer coating disposed on at least a portion of at least one of the first or the second surfaces; and
an effective fracture toughness that is greater than or equal to 1.25 MPa·m$^{0.5}$ as measured at room temperature.

Embodiment 2. The glass-based article of Embodiment 1, wherein the effective fracture toughness of the glass-based article is measured using a double torsion method at a temperature of 20° C.

Embodiment 3. The glass-based article of any preceding Embodiment, wherein the perimeter portion comprises finished edges.

Embodiment 4. The glass-based article of any preceding Embodiment, wherein an average thickness of the polymer coating ($t_c$) is greater than or equal to 5 micrometers and/or is less than or equal to 150 micrometers.

Embodiment 5. The glass-based article of the preceding Embodiment, wherein the average thickness of the polymer coating ($t_c$) is greater than or equal to 10 micrometers and/or is less than or equal to 90 micrometers.

Embodiment 6. The glass-based article of any preceding Embodiment, wherein the polymer coating comprises a polymer comprising a first material index ($MI_1$) as defined by $MI_1 = \theta^{0.5} \sigma_y$, wherein $\theta$ is elongation of the polymer in percentage and $\sigma_y$ is tensile strength of the polymer in MPa, where $MI_1$ is greater than or equal to 35 MPa and/or less than or equal to 100 MPa.

Embodiment 7. The glass-based article of any preceding Embodiment, wherein the polymer coating comprises a polymer comprising a second material index ($MI_2$) as defined by $MI_2 = \theta \sigma_y$, wherein $\theta$ is elongation of the polymer in percentage and $\sigma_y$ is tensile strength of the polymer in MPa, where $MI_2$ is greater than or equal to 12 MPa and/or less than or equal to 75 MPa.

Embodiment 8. The glass-based article of any preceding Embodiment, wherein the polymer coating comprises a polymer comprising a third material index ($MI_3$) as defined by $MI_3 = \theta \sigma_y^2 / E$, where $\theta$ is elongation, $\sigma_y$ is the tensile strength in MPa, and E is the Young's Modulus in GPa, the range of $MI_3$ being greater than or equal to 0.5 MPa and/or less than or equal to 5 MPa.

Embodiment 9. The glass-based article of any preceding Embodiment, wherein the polymer coating comprises a polymer selected from the group consisting of: polyimides, polyamides, polysulfones, polybenzimidazoles, silicones, epoxies, acrylates, and combinations thereof.

Embodiment 10. The glass-based article of the preceding Embodiment, wherein the polymer coating comprises a polyimide.

Embodiment 11. The glass-based article of any preceding Embodiment, wherein the glass-based substrate comprises in mole percent: greater than or equal to 55% to less than or equal to 70% $SiO_2$, and greater than or equal to 10% to less than or equal to 20% $Al_2O_3$.

Embodiment 12. The glass-based article of any preceding Embodiment, wherein the glass-based substrate comprises in mole percent: 55 to 70% $SiO_2$, 10 to 20% $Al_2O_3$, 0 to 7% $P_2O_5$, 0 to 20% $Li_2O$, and 0 to 20% $Na_2O$.

Embodiment 13. The glass-based article of any preceding Embodiment, wherein the glass-based substrate comprises in mole percent: 60 to 80% $SiO_2$, 10 to 18% $Al_2O_3$, 0 to 15% $B_2O_3$, 0 to 20% RO, wherein RO is alkaline earth metal oxides and wherein the substrate is substantially free of alkaline metal oxides.

Embodiment 14. The glass-based article of any preceding Embodiment, wherein $t_s$ is greater than or equal to 0.02 mm and less than or equal to 1.3 mm.

Embodiment 15. A consumer electronic product comprising:
a housing comprising a front surface, a back surface, and side surfaces;
electrical components at least partially within the housing, the electrical components comprising at least a controller, a memory, and a display, the display at or adjacent the front surface of the housing; and
a cover disposed over the display;

wherein a portion of at least one of the housing and the cover comprises the glass-based article of any preceding Embodiment.

Embodiment 16. A process for making a glass-based article based in part on mechanical modeling, the glass-based article comprising an effective fracture toughness ($K_C$), the process comprising:

disposing a polymer precursor on at least a portion of at least one of first and second surfaces of a glass-based substrate that comprises: a substrate thickness ($t_s$) defined by the first and second surfaces, a glass composition-based fracture toughness ($K_g$), wherein the polymer precursor delivers a polymer comprising a tensile strength $\sigma_y$ in MPa; and curing the polymer precursor to form a polymer coating comprising an average coating thickness ($t_c$) on the glass-based substrate to form a glass-based article;

wherein the $K_C$ is defined by:

$$K_c = K_g * (1 + \alpha \beta^2/\gamma)^{0.5} \qquad (I),$$

wherein $\alpha$ is the ratio of coating thickness ($t_c$) to glass-based substrate thickness ($t_s$), $\beta$ is the ratio of $K_m$ to $K_g$, $\gamma$ is the ratio of Young's Modulus of the polymer ($E_p$) to Young's Modulus of the glass ($E_g$), and $K_m$ is a value of greater than or equal to 0.45 MPa*m$^{0.5}$ to less than or equal to 10 MPa*m$^{0.5}$.

Embodiment 17. The process of Embodiment 16, wherein the glass-based article comprises an effective fracture toughness that is greater than or equal to 1.25 MPa·m$^{0.5}$ as measured at room temperature.

Embodiment 18. The process of Embodiment 16, wherein the effective fracture toughness is measured using a double torsion method at a temperature of 20° C.

Embodiment 19. The process of one of Embodiments 16 to 18, wherein the polymer precursor delivers a polymer comprising a first material index ($MI_1$) as defined by $MI_1 = \theta^{0.5} \sigma_y$, wherein $\theta$ is elongation and the $\sigma_y$ is the tensile strength in MPa, the range of $MI_1$ being greater than or equal to 35 MPa and/or less than or equal to 100 MPa.

Embodiment 20. The process of one of Embodiments 14 to 19, wherein the polymer precursor delivers a polymer comprising a second material index ($MI_2$) as defined by $MI_2 = \theta \sigma_y$, wherein $\theta$ is elongation of the polymer in percentage and $\sigma_y$ is tensile strength of the polymer in MPa, where $MI_2$ is greater than or equal to 12 MPa and/or less than or equal to 75 MPa.

Embodiment 21. The process of one of Embodiments 16 to 20, wherein the polymer precursor delivers a polymer comprising a third material index ($MI_3$) as defined by $MI_3 = \theta \sigma_y^2/E$, where $\theta$ is elongation, $\sigma_y$ is the tensile strength in MPa, and E is the Young's Modulus in GPa, the range of $MI_3$ being greater than or equal to 0.5 MPa and/or less than or equal to 5 MPa.

Embodiment 22. The process of one of Embodiments 16 to 21, wherein the average coating thickness ($t_c$) is greater than or equal to 5 micrometers and/or is less than or equal to 150 micrometers.

Embodiment 23. A method of manufacturing a glass-based article comprising:

disposing a polymer precursor on at least a portion of at least one of first and second surfaces of a glass-based substrate that comprises: a substrate thickness ($t_s$) defined by the first and second surfaces, a substantially planar central portion, and a perimeter portion; and curing the polymer precursor to form a polymer coating on the glass-based substrate to form a glass-based article comprising an effective fracture toughness that is greater than or equal to 1.25 MPa·m$^{0.5}$ as measured at room temperature.

Embodiment 24. The method of Embodiment 23, wherein the curing is conducted at a temperature of greater than or equal to 300° C.

Embodiment 25. The method of one of Embodiments 23 to 24, wherein applying the polymer precursor comprises applying a solution comprising at least one monomer and at least one solvent.

Embodiment 26. The method of one of Embodiments 23 to 25, wherein applying the polymer coating comprises spreading by a doctor blade.

Embodiment 27. The method of one of Embodiments 23 to 26, wherein the polymer coating comprises a polymer selected from the group consisting of: polyimides, polyamides, polysulfones, polybenzimidazoles, silicones, epoxies, acrylates, and combinations thereof.

Embodiment 28. The method of one of Embodiments 23 to 27, wherein an average thickness of the polymer coating ($t_c$) is greater than or equal to 5 micrometers and/or is less than or equal to 150 micrometers.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
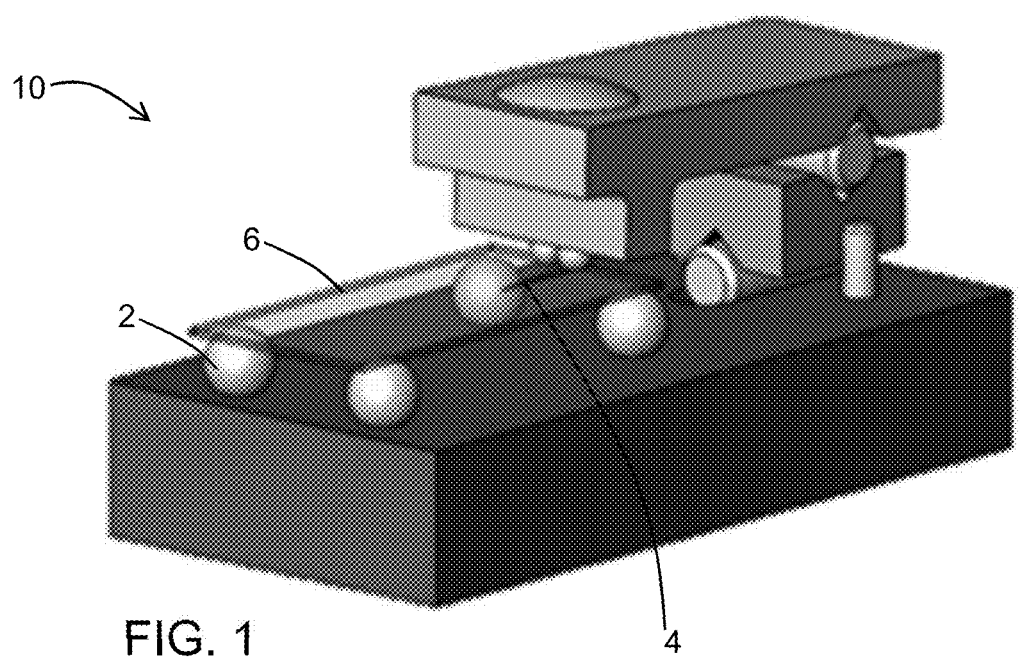
FIG. 1 schematically depicts an apparatus for conducting a double torsion (DT) method.

Before describing several exemplary embodiments, it is to be understood that the disclosure is not limited to the details of construction or process steps set forth in the following disclosure. The disclosure provided herein is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases for example "in one or more embodiments," "in certain embodiments," "in various embodiments," "in one embodiment" or "in an embodiment" in various places throughout this specification are not necessarily referring to the same embodiment, or to only one embodiment. Furthermore, the particular features, structures, materials, or characteristics of any of the embodiments may be combined in any suitable manner together with one or more of the other embodiments in order to form a different one or more embodiments.

Definitions and Measurement Techniques

The terms "glass-based article" and "glass-based substrates" are used to include any object made wholly or partly of glass, including glass-ceramics (including an amorphous phase and a crystalline phase). Laminated glass-based articles include laminates of glass and non-glass materials, laminates of glass and crystalline materials. Glass-based substrates according to one or more embodiments can be selected from soda-lime silicate glass, alkali-alumino silicate glass, alkali-containing borosilicate glass, alkali-containing aluminoborosilicate glass, and alkali-containing glass-ceramics.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

Unless otherwise specified, all compositions described herein are expressed in terms of mole percent (mol %) on an oxide basis.

As utilized herein, fracture toughness ($K_{IC}$) of a sample was measured by a double torsion (DT) standard method. The DT method is described in "Fracture Toughness of Thin Plates by the Double-Torsion Test Method" as presented to the Ceramic Engineering and Science proceedings, 2006 by Jonathan Salem et. al. The $K_{IC}$ values measured on glass-based substrates are denoted as "$K_g$". The $K_{IC}$ values measured on glass-based articles are denoted as "$K_c$" to reflect an effective fracture toughness of the glass articles comprising the combination of a glass-based substrate (having the $K_g$) and a polymer coating (having a $K_m$). No ion exchange was conducted on the glass-based substrates herein. Fracture toughness is a measure of a material's resistance to crack propagation. The DT test apparatus 10 is shown in FIG. 1. The DT configuration comprises a symmetric four-point loading 2 around a notch 4 on one end of a rectangular test plate 6, which produces torsional deformation in the two plate halves, driving the formation of a crack originating from the tip of the notch. The stress intensity factor obtained using this method is independent of crack length in the test specimen. The DT method can be used to test the fracture toughness of thin glass plates for example display glass. The DT method can also be used to evaluate slow crack growth behavior of the material. The DT method is conducted at room temperature, which is nominally in the range of greater than or equal to 20° C. to less than or equal to 40° C.

Each coated or uncoated sample was prepared by saw-cutting a notch with a length of about 35% of the sample length and pre-cracking the sample with an initial crack length of about 5% to about 30% of the sample length using a slow pre-loading speed of 0.01 mm/minute (min). The pre-cracked sample was then positioned in a loading fixture and placed in a furnace box. The glass sample was allowed to sit in the furnace until reaching thermal equilibrium at the desired temperature. A motor was then triggered to push the loading rod down at a loading speed of 0.06 mm/min with coating under tension. A load vs. time curve was recorded and the peak load was extracted to calculate the fracture toughness ($K_{IC}$) value using Equation (A):

$$K_{IC} = PW_m \sqrt{\frac{3}{W(1-v)t^4\varphi}} \quad (A)$$

where P is peak load (N); $W_m$ is the distance from the loading point to the support point (mm), that is, the lateral distance as in the plane of the surface of the sample from the point where the upper loading ball contacts the sample to the point where the lower support ball contacts the sample in a direction generally perpendicular to that of the notch 4 without crossing the notch 4, i.e., the loading and support balls are on the same side of the notch 4 as each other; v is the Poisson ratio; W is the specimen width (mm); t is the specimen thickness (mm); and φ is the thickness correction factor.

Average coating thickness of the polymer coating was measured by a profilometer, which was a stylus surface profilometer.

General Overview of Properties of Glass-Based Articles

Figure 2:
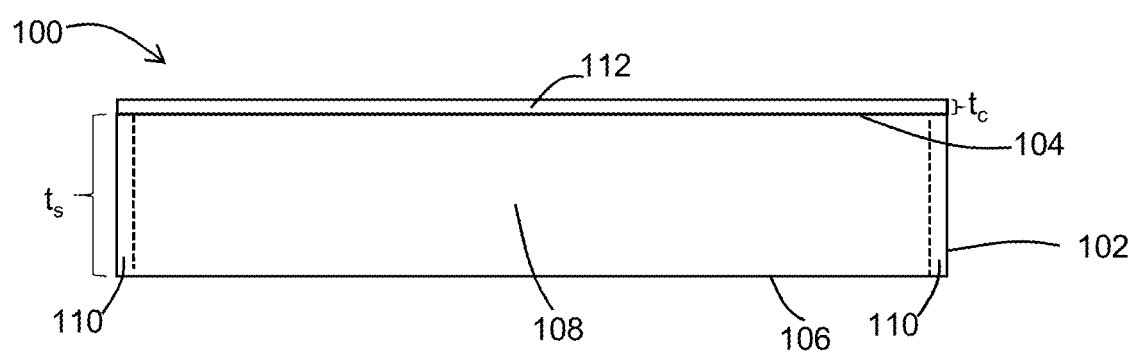
FIG. 2 is a schematic representation of a cross-section of a glass-based article in accordance with an embodiment.

Glass-based articles herein exhibit high effective fracture toughness ($K_C$). Turning to FIG. 2, glass-based articles disclosed herein comprise a glass-based substrate 102 comprising a first surface 104 opposing a second surface 106, defining a substrate thickness ($t_s$). The substrate has a substantially planar central portion 108 and a perimeter portion 110 suitable for its applications. The perimeter portion 110 may optionally comprise finished edges, obtained by, for example, edge polishing. A polymer coating 112 having an average coating thickness ($t_c$) is disposed on at least a portion of at least one of the first or the second surfaces, which in FIG. 2 is exemplified in a non-limiting way by a coating on the entirety of first surface 104.

In one or more embodiments, the glass-based article comprises an effective fracture toughness of greater than or equal to 1.25 MPa*m$^{0.5}$, for example, greater than or equal to 1.50 MPa*m$^{0.5}$, 2.0 MPa*m$^{0.5}$, or 2.5 MPa*m$^{0.5}$; and/or a fracture toughness of less than or equal to 5.0 MPa*m$^{0.5}$, for example less than or equal to 4.5 MPa*m$^{0.5}$, 4.0 MPa*m$^{0.5}$, 3.5 MPa*m$^{0.5}$, or 3.0 MPa*m$^{0.5}$; and all values and subranges therebetween.

In one or more embodiments, the glass-based article comprises a thickness ($t_A$) that is nominally the thickness of the substrate ($t_s$) plus and the thickness of the coating ($t_c$). The $t_A$ may be in the range of greater than or equal to 0.025 mm to less than or equal to 1.450 mm, and all values and subranges therebetween; and/or the $t_A$ may be less than or equal to 1.2 mm, less than or equal to 1.1 mm, less than or equal to 1.0 mm, less than or equal to 0.9 mm, less than or equal to 0.8 mm, less than or equal to 0.7 mm, less than or equal to 0.6 mm, less than or equal to 0.5 mm, less than or equal to 0.4 mm, less than or equal to 0.3 mm, or less than or equal to 0.2 mm. In some embodiments, the article has a thickness ($t_A$) in the range of greater than or equal to 0.2 mm and less than or equal to 0.8 mm. In some embodiments, the $t_A$ is in the range of greater than or equal to 30 micrometers and less than or equal to 275 micrometers, which may be used in the formation of ultra-thin, bendable glass articles.

The glass articles herein offer the advantage of overall improvement in fracture resistance by applying a polymer coating with selected mechanical properties to increase effective fracture toughness of the underlying glass substrate. Increased effective fracture toughness is expected as coating thickness increases and/or as the mechanical properties of the selected polymer material are improved. The coating may be transparent for some applications. The coating may be applied on glass at room temperature and is feasible for scale-up and mass production. Relative to uncoated substrates, the glass articles herein are improved and can provide 1.2 to 4 times or more fracture toughness.

Polymer Coating

According to various embodiments, the polymer coating on at least a portion of the first and/or second surfaces can have a thickness of greater than or equal to 5 micrometers (μm) and/or of less than or equal to 150 micrometers (μm), for example ranging: from greater than or equal to 10 μm to less than or equal to 125 greater than or equal to 15 μm to less than or equal to 100 greater than or equal to 20 μm to less than or equal to 90 greater than or equal to 30 μm to less than or equal to 80 greater than or equal to 40 μm to less than or equal to 70 greater than or equal to 50 μm to less than or equal to 60 μm, including all ranges and subranges therebetween. In certain embodiments, the polymer coating may not have a uniform thickness across the area of application and, in such embodiments, the thickness of the coating can correspond to an average thickness across the coated area. In other embodiments, the polymer coating can be formed by multiple applications of polymer sub-coatings and, in such embodiments, the thickness of the coating can correspond to an aggregate thickness of all sub-coatings.

In some embodiments, the polymer coating is disposed over the entirety of only one surface. In some embodiments, the polymer coating is disposed over the entirety of both surfaces. In other embodiments, the polymer coating is disposed partially over only one surface. In other embodiments, the polymer coating is disposed partially over both surfaces. In other embodiments, the polymer coating is disposed over the entirety of one surface and partially over the other surface. A polymer coating disposed partially over a surfaces may cover greater than or equal to 1% and/or less than or equal to 99% of the surface area of the surface, including greater than or equal to 5%, greater than or equal to 10%, greater than or equal to 15%, greater than or equal to 20%, greater than or equal to 25%, greater than or equal to 30%, greater than or equal to 35%, greater than or equal to 40%, greater than or equal to 45%, greater than or equal to 50%, and/or less than or equal to 55%, less than or equal to 60%, less than or equal to 65%, less than or equal to 70%, less than or equal to 75%, less than or equal to 80%, less than or equal to 85%, less than or equal to 90%, or less than or equal to 95%.

By way of non-limiting example, suitable polymer compositions can be chosen from polyimides, polyamides, polysulfones, polybenzimidazoles, silicones, epoxies, acrylates, and any other polymers that provide effective mechanical properties. In some embodiments, the polymer composition may be a thermoplastic polymer. In additional embodiments, the polymer composition may be a thermally curable polymer, e.g., undergoing a crosslinking reaction at elevated temperatures, for example at temperatures equal to or greater than about 300° C.

In some embodiments, exemplary compositions suitable for use as a polymer precursor can include polymers that are thermally stable at temperatures equal to or greater than 300° C., for example ranging from about 300° C. to about 600° C., from about 325° C. to about 550° C., from about 350° C. to about 500° C., or from about 400° C. to about 450° C., including all ranges and subranges therebetween. As used herein, the term "thermally stable" and variations thereof is intended to denote that the onset point of thermal degradation of the composition, as indicated by the beginning of weight loss.

For example, polyimides, for example aromatic polyimides, are thermally curable thermoplastic polymers that are thermally stable at temperatures equal to or greater than about 400° C. Aromatic polyimides may also exhibit at least one of chemical and/or mechanical robustness, high ductility, low CTE, low dielectric constant, and/or low flammability. Two exemplary aromatic polyimides, and their respective crosslinking reactions (A) and (B), are produced below for illustrative purposes. In the first reaction (A), polyamic acid (PAA) is thermally cured to produce polyimide (PI). In the second reaction (B), poly(pyromellitic dianhydride-co-4,4'-oxydianiline), amic acid (PMDA-ODA PAA) is thermally cured to form Kapton®, which is a polyimide available from DuPont that is stable across a wide range of temperatures from −269° C. to greater than 400° C.

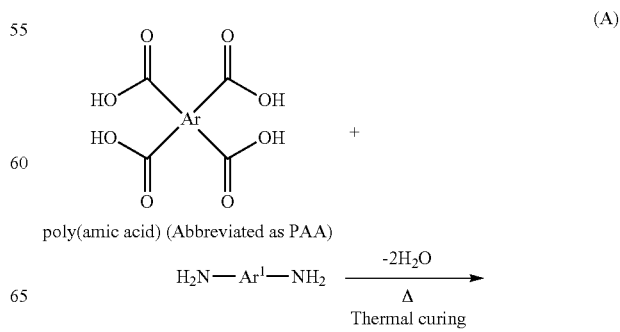

poly(amic acid) (Abbreviated as PAA)

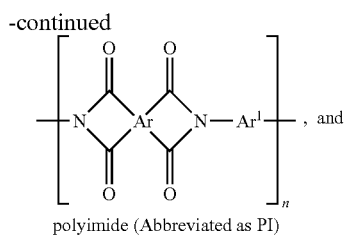

polyimide (Abbreviated as PI)

(B)

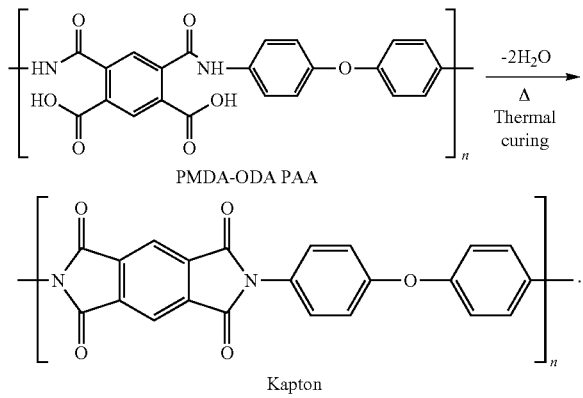

The polymer coating may be applied directly to a glass-based substrate surface and may, as discussed above, be thermally stable at the surface temperature of the substrate. In other embodiments, discussed in more detail below, the precursor(s) of a thermally curable polymer, for example the polyamic acid precursors depicted above, can be applied to a surface at room temperature or higher, and subsequently cured in situ to form the polymer coating. For example, the surface temperature of the glass-based substrate may be greater than or equal to 20° C. and/or less than or equal to 600° C., for example greater than or equal to 25° C., greater than or equal to 50° C., greater than or equal to 75° C., greater than or equal to 100° C., greater than or equal to 125° C., greater than or equal to 150° C., greater than or equal to 175° C., greater than or equal to 200° C., greater than or equal to 225° C., greater than or equal to 250° C., greater than or equal to 275° C., greater than or equal to 300° C., and/or less than or equal to 550° C., less than or equal to 500° C., less than or equal to 450° C., less than or equal to 400° C., less than or equal to 350° C., including all ranges and subranges therebetween.

Methods of application of the precursor compositions include spray-coating, casting, and/or printing. Methods of application of the precursor compositions are amenable to mass production. In some embodiments, casting by use of doctor blades at varying gaps (e.g., 5 mil, 10 mil, 25 mil, 50 mil, wherein one mil is one thousandth of an inch or 0.0254 mm) allows for application of coatings having thicknesses of greater than or equal to 5 micrometers. In some embodiments, spray-coating using diluted precursor compositions allows for application of coatings having thicknesses of less than 5 micrometers. Curing can occur in-situ or off-line.

Glass-Based Substrates

Examples of glasses that may be used as substrates may include soda-lime silicate compositions, alkali-alumino silicate glass compositions or alkali-containing aluminoborosilicate glass compositions, though other glass compositions are contemplated. Specific examples of glass-based substrates that may be used include but are not limited to a soda-lime silicate glass, an alkali-alumino silicate glass, an alkali-containing borosilicate glass, an alkali-alumino borosilicate glass, an alkali-containing lithium alumino silicate glass, or an alkali-containing phosphate glass. Optionally, the glass-based substrates have base compositions that may be characterized as ion exchangeable. As used herein, "ion exchangeable" means that a substrate comprising the composition is capable of exchanging cations located at or near the surface of the substrate with cations of the same valence that are either larger or smaller in size.

In embodiments, the glass-based substrates may be formed from any composition capable of being ion exchanged to form a desired stress profile. In some embodiments, the glass-based substrates may be formed from the glass compositions described in U.S. Provisional Application No. 62/591,953 titled "Glasses with Low Excess Modifier Content," filed Nov. 29, 2017, the entirety of which is incorporated herein by reference. In some embodiments, the glass articles may be formed from the glass compositions described in U.S. Provisional Application No. 62/591,958 titled "Ion-Exchangeable Mixed Alkali Aluminosilicate Glasses," filed Nov. 29, 2017, the entirety of which is incorporated herein by reference.

The glass-based substrates may be characterized by the manner in which it may be formed. For instance, the glass-based substrates may be characterized as float-formable (i.e., formed by a float process), down-drawable and, in particular, fusion-formable or slot-drawable (i.e., formed by a down draw process for example a fusion draw process or a slot draw process).

Some embodiments of the glass-based substrates described herein may be formed by a down-draw process. Down-draw processes produce glass-based substrates having a uniform thickness that possess relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

Some embodiments of the glass-based substrates may be described as fusion-formable (i.e., formable using a fusion down-draw process). The fusion process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass article. A fusion drawn glass article has a fusion line at its center where the two glass films came together, wherein the fusion line is detectable by microscope. The fusion draw method offers the advantage that, because the two glass films flowing over the channel fuse together, neither of the outside surfaces of the resulting glass article comes in contact with any part of the apparatus. Thus, the surface properties of the fusion drawn glass article are not affected by such contact.

Some embodiments of the glass-based substrates described herein may be formed by a slot draw process. The slot draw process is distinct from the fusion draw method. In slot draw processes, the molten raw material glass is provided to a drawing tank. The bottom of the drawing tank has an open slot with a nozzle that extends the length of the slot. The molten glass flows through the slot and/or nozzle and is drawn downward as a continuous glass article and into an annealing region. Slot-drawn substrates do not have a fusion line.

In one or more embodiments, the glass-based substrates described herein may exhibit an amorphous microstructure and may be substantially free of crystals or crystallites. In other words, the glass-base substrates exclude glass-ceramic materials in some embodiments.

In embodiments of glass compositions described herein, the concentration of constituent components (e.g., $SiO_2$, $Al_2O_3$, $Li_2O$, and the like) are given in mole percent (mol %) on an oxide basis, unless otherwise specified. It should be understood that any of the variously recited ranges of one component may be individually combined with any of the variously recited ranges for any other component.

In some embodiments the glass-based substrates comprise a glass composition-based fracture toughness ($K_g$) of greater than or equal to $0.8$ MPa*m$^{0.5}$, for example, greater than or equal to $0.85$ MPa*m$^{0.5}$, $0.9$ MPa*m$^{0.5}$, or $0.95$ MPa*m$^{0.5}$; and/or a fracture toughness of less than or equal to $1.25$ MPa*m$^{0.5}$, for example less than or equal to $1.2$ MPa*m$^{0.5}$, $1.15$ MPa*m$^{0.5}$, $1.1$ MPa*m$^{0.5}$, or $1.0$ MPa*m$^{0.5}$; and all values and subranges therebetween.

In one or more embodiments, the glass-based substrate comprises $t_s$ in the range of greater than or equal to 0.02 mm to less than or equal to 1.3 mm, and all values and subranges therebetween; and/or $t_s$ may be less than or equal to 1.2 mm, less than or equal to 1.1, less than or equal to 1.0 mm, less than or equal to 0.9 mm, less than or equal to 0.8 mm, less than or equal to 0.7 mm, less than or equal to 0.6 mm, less than or equal to 0.5 mm, less than or equal to 0.4 mm, less than or equal to 0.3 mm, or less than or equal to 0.2 mm. In some embodiments, the substrate is in the range of greater than or equal to 0.2 mm and less than or equal to 0.8 mm. In some embodiments, the substrate has a thickness in the range of greater than or equal to 25 micrometers and less than or equal to 125 micrometers, which may be used in the formation of ultra-thin, bendable glass articles.

In some embodiments, the glass-based substrate comprises in mole percent: greater than or equal to 55% to less than or equal to 70% $SiO_2$, and greater than or equal to 10% to less than or equal to 20% $Al_2O_3$. In some embodiments, the glass-based substrate comprises in mole percent: 55 to 70% $SiO_2$, 10 to 20% $Al_2O_3$, 0 to 7% $P_2O_5$, 0 to 20% $Li_2O$, and 0 to 20% $Na_2O$. In some embodiments, the glass-based substrate comprises in mole percent: 60 to 80% $SiO_2$, 10 to 18% $Al_2O_3$, 0 to 15% $B_2O_3$, 0 to 20% RO, wherein RO is alkaline earth metal oxides and wherein the substrate is substantially free of alkaline metal oxides.

Ion Exchange (IOX) Treatment

In some embodiments, the glass-based substrate is not exposed to any IOX treatment prior to coating with the polymer precursor.

In some embodiments, optional chemical strengthening of glass substrates having base compositions is done by placing the ion-exchangeable glass substrates in a molten bath containing cations (e.g., K+, Na+, Ag+, etc.) that diffuse into the glass while the smaller alkali ions (e.g., Na+, Li+) of the glass diffuse out into the molten bath. The replacement of the smaller cations by larger ones creates compressive stresses near the top surface of glass. Tensile stresses are generated in the interior of the glass to balance the near-surface compressive stresses.

With respect to ion exchange processes, they may independently be a thermal-diffusion process or an electro-diffusion process. Non-limiting examples of ion exchange processes in which glass is immersed in multiple ion exchange baths, with washing and/or annealing steps between immersions, are described in U.S. Pat. No. 8,561,429, by Douglas C. Allan et al., issued on Oct. 22, 2013, entitled "Glass with Compressive Surface for Consumer Applications," and claiming priority from U.S. Provisional Patent Application No. 61/079,995, filed Jul. 11, 2008, in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass is strengthened by ion exchange in a first bath is diluted with an effluent ion, followed by immersion in a second bath having a smaller concentration of the effluent ion than the first bath. The contents of U.S. Pat. Nos. 8,561,429 and 8,312,739 are incorporated herein by reference in their entireties.

After an ion exchange process is performed, it should be understood that a composition at the surface of a glass article may be different than the composition of the as-formed glass article (i.e., the glass article before it undergoes an ion exchange process). This results from one type of alkali metal ion in the as-formed glass, for example, for example Li$^+$ or Na$^+$, being replaced with larger alkali metal ions, for example, for example Na$^+$ or K$^+$, respectively. However, the glass composition at or near the center of the depth of the glass article will, in embodiments, still have the composition of the as-formed glass article.

End Products

Figure 3A:
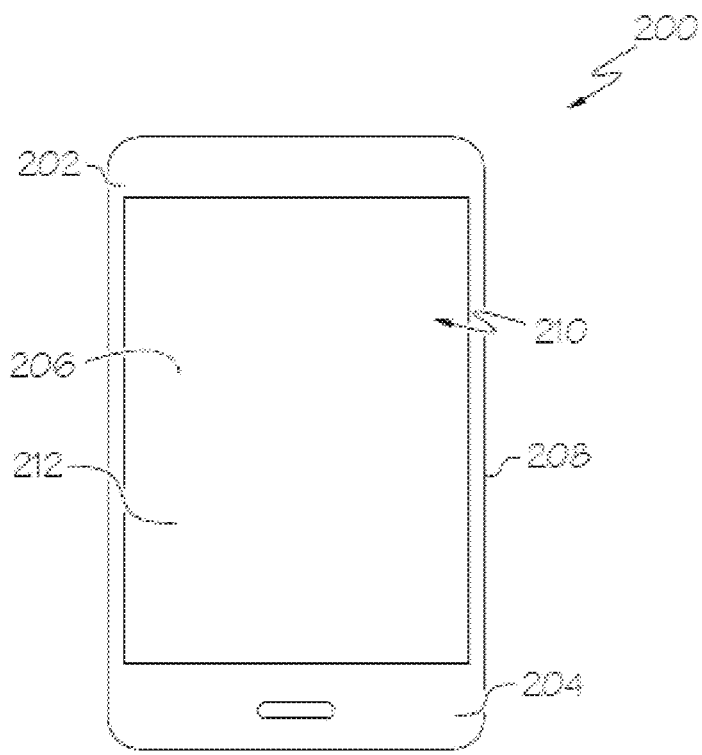
FIG. 3A is a plan view of an exemplary electronic device incorporating any of the glass articles disclosed herein.
Figure 3B:
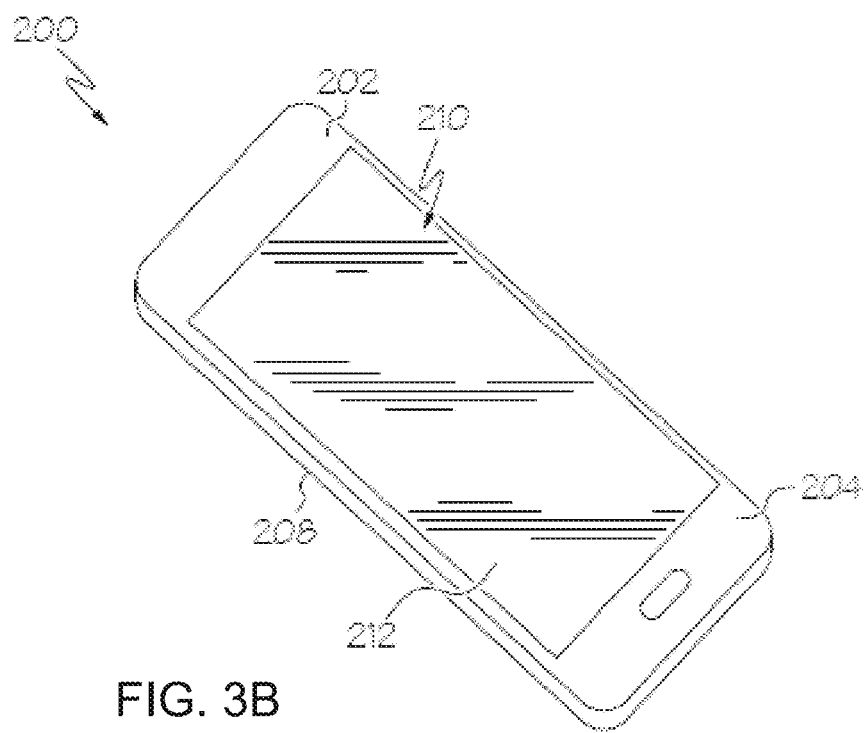
FIG. 3B is a perspective view of the exemplary electronic device of FIG. 3A.

The glass-based articles disclosed herein may be incorporated into another article for example an article with a display (or display articles) (e.g., consumer electronics, including mobile phones, tablets, watches, computers, navigation systems, and the like), architectural articles, transportation articles (e.g., automobiles, trains, aircraft, sea craft, etc.), appliance articles, or any article that would benefit from some transparency, scratch-resistance, abrasion resistance or a combination thereof. An exemplary article incorporating any of the glass articles disclosed herein is shown in FIGS. 3A and 3B. Specifically, FIGS. 3A and 3B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In some embodiments, the cover substrate 212 may include any of the glass articles disclosed herein.

Modeling

With respect to effective fracture toughness ($K_C$) improvement of a glass article including a polymer coating, without intending to be bound by theory, stretching of the polymer at a crack tip could lead to additional dissipation, which causes an effective fracture toughness $K_C$ to increase. Based on this mechanism, a mechanical model was built with assumption that the crack will not propagate if a critical crack tip opening displacement is not reached. The effective fracture toughness ($K_C$) of the composite (glass and coating) can be expressed in the following theoretical equation (I):

$$K_c[K_g, \alpha, \beta, \gamma] := K_g^*(1+\alpha\beta^2/\gamma)^{0.5} \qquad (I)$$

where $K_g$ is the fracture toughness of the glass-based substrate; $\alpha$ is the ratio of coating thickness ($t_c$) to glass-based substrate thickness ($t_s$); $\beta$ is the ratio of $K_m$ to $K_g$; and γ is the ratio of Young's Modulus of the polymer ($E_r$) to Young's Modulus of the glass ($E_g$). $K_m$ is the effective fracture toughness of the polymer at the micro-scale. In practice, $K_m$ was obtained by fitting the experimental data in accordance with Equation (I). It was found that $K_m$ was in the range of 1.45 to 4.23 MPa*m$^{0.5}$ in order to fit the data. It was surprising to achieve improved effective fracture toughness by addition of a thin coating of polymer. Prior to obtaining the experimental data, such an improvement was not expected especially considering that the coating thickness is insignificant compared to the glass thickness. Suitable values of $K_m$ could be in the range of greater than or equal to 0.45 MPa*m$^{0.5}$ to less than or equal to 10 MPa*m$^{0.5}$.

For a fundamental understanding of $K_m$, the following theoretical Equation (II) can be referenced:

$$K_m = 2.13 r_p^{0.5} \sigma_y \quad \text{(II)}$$

where $\sigma_y$ is yield strength of the polymer and $r_p$ is a stretching distance at the crack tip, which is considered to be larger than but proportional to the macro plastic strain or elongation. In practice, obtaining a measurement of $r_p$ can be challenging. Equation (II) is informative to show that $K_m$ is proportional to the polymer's yield strength ($\sigma_y$).

Figure 6:
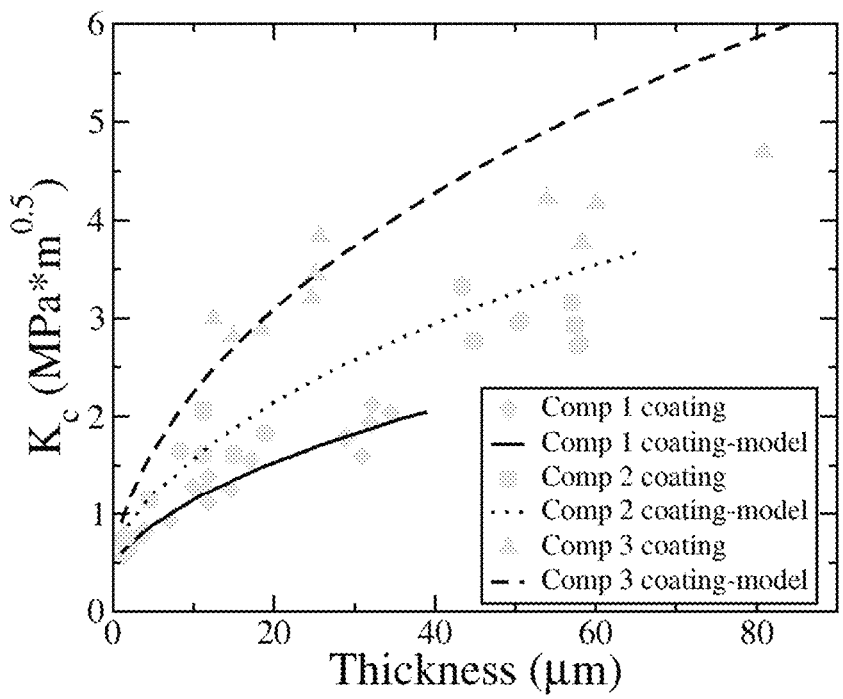
FIG. 6 is a comparison of $K_C$ versus coating thickness (micrometers) for experimental and modeled fracture toughness.

The mechanical model of Equation (I) versus experimental data is described in Example 7 and depicted in FIG. 6.

The $K_C$ value may be increased by: increasing coating thickness (thus α) and/or increasing polymer yield strength $\sigma_y$ or/and increasing stretching distance $r_p$. A material selection index (MI) identifies a suitable coating polymer to achieve a maximum effective fracture toughness improvement based on polymer characteristics of yield (or tensile) strength $\sigma_y$ and elongation θ. ASTM D882-02 can be used to measure tensile strength and elongation.

In summary, effective fracture toughness of a glass-based article may be modeled for a starting glass-based substrate having a glass composition-based fracture toughness ($K_g$) (MPa*m$^{0.5}$) by selecting a polymer having a tensile strength $\sigma_y$ (MPa) and elongation θ and optionally having a Young's Modulus $E_p$.

An exemplary first material index ($MI_1$) is recited as:

$$MI_1 = \theta^{0.5} \sigma_y$$

Suitable $MI_1$ values are greater than or equal to 35 MPa and/or less than or equal to 100 MPa, including greater than or equal to 39 MPa and/or less than or equal to 95 MPa, including greater than or equal to 39 MPa and/or less than or equal to 95 MPa, including greater than or equal to 45 MPa and/or less than or equal to 90 MPa, including greater than or equal to 50 MPa and/or less than or equal to 85 MPa, including greater than or equal to 55 MPa and/or less than or equal to 80 MPa, including greater than or equal to 60 MPa and/or less than or equal to 75 MPa, including greater than or equal to 65 MPa and/or less than or equal to 70 MPa, and including all values and subranges therebetween.

A second material index is $MI_2$:

$$MI_2 = \theta \sigma_y$$

Suitable $MI_2$ values are greater than or equal to 12 MPa and/or less than or equal to 75 MPa, including greater than or equal to 17 MPa and/or less than or equal to 60 MPa, including greater than or equal to 20 MPa and/or less than or equal to 55 MPa, including greater than or equal to 25 MPa and/or less than or equal to 50 MPa, including greater than or equal to 30 MPa and/or less than or equal to 45 MPa, including greater than or equal to 35 MPa and/or less than or equal to 40 MPa, including all values and subranges therebetween.

A third material index is $MI_3$:

$$MI_3 = \theta \sigma_y^2 / E_p.$$

Suitable $MI_3$ values are greater than or equal to 0.5 MPa and/or less than or equal to 5 MPa, including greater than or equal to 0.8 MPa and/or less than or equal to 2.75 MPa, including greater than or equal to 0.9 MPa and/or less than or equal to 2.5 MPa, including greater than or equal to 1.0 MPa and/or less than or equal to 2.25 MPa, including greater than or equal to 1.25 MPa and/or less than or equal to 2.00 MPa, including greater than or equal to 1.50 MPa and/or less than or equal to 1.75 MPa, including all values and subranges therebetween.

EXAMPLES

Embodiments will be further clarified by the following examples. It should be understood that these examples are not limiting to the embodiments described above.

Glass substrates were obtained comprising a composition according to Composition A, Composition B, or Composition C.

Glass Composition A was a soda-lime silicate composition nominally comprising (±0.75 wt %): 73.5 wt % $SiO_2$, 1.7 wt % $Al_2O_3$, 12.28 wt % $Na_2O$, 0.24 wt % $K_2O$, 4.5 wt % MgO, 7.45 wt % CaO, 0.017 wt % $ZrO_2$, 0.032 wt % $TiO_2$, 0.002 wt % $SnO_2$, 0.093 wt % $Fe_2O_3$, 0.001 $HfO_2$, 0.028 wt % Cl oxides, and 0.203 wt % $SO_3$.

Glass Composition B was a lithium aluminoborosilicate composition nominally comprising (±0.75 mol %): 63 mol % $SiO_2$, 7 mol % $B_2O_3$, 15 mol % $Al_2O_3$, 4 mol % $Na_2O$, 7 mol % $Li_2O$, 1 MgO, 0.02 mol % $Fe_2O_3$, 1 mol % SrO, 2 mol % CaO and 0.07 mol % $SnO_2$.

Glass Composition C was an aluminosilicate composition (lithium-free) nominally comprising (±0.75 mol %): 57 mol % $SiO_2$, 16 mol % $Al_2O_3$, 17 mol % $Na_2O$, 3 MgO, 0.003 mol % $TiO_2$, 0.07 mol % $SnO_2$, and 7 mol % $P_2O_5$. Glass Composition C has a Young's Modulus ($E_g$) of 65 GPa.

Polymer precursor compositions for forming polymer coatings were obtained comprising compositions according to Precursor Composition I, Precursor Composition II, and Precursor Composition III.

Precursor Composition I is a polyimide precursor sold under the tradename Kapton® by DuPont, which is a solution of 15.0 wt. % poly(pyromellitic dianhydride-co-4, 4'-oxydianiline) amic acid (PMDA-ODA PAA) in 85.0 wt. % 1-methyl-2-pyrrolidinone (NMP).

Precursor Composition II is a polyimide precursor sold under the tradename VT300A-G008 PI from FlexUp Technologies Co., which contains 5 wt. %-20 wt. % of modified polyimide and 80-95 wt. % of gamma-Butyrolactone (GBL). The resulting coatings were transparent.

Precursor Composition III is a polyimide precursor sold under the tradename PI-2574 from HD MicroSystems, which includes an adhesion promotor.

Table 1 compares the tensile strength σ and elongation Θ of these three different types of polyimide coating material.

TABLE 1

| Precursor Composition Polymer | Tensile strength σ (MPa) | Elongation Θ | Young's Modulus, $E_p$ GPa | Material index ($MI_1$) ($\sigma * \Theta^{0.5}$) (MPa) | Material index ($MI_2$) ($\sigma * \Theta$) (MPa) | Material index ($MI_3$) ($\sigma^2 * \Theta/E_p$) (MPa) |
|---|---|---|---|---|---|---|
| I | 89.9 | 19% | 1.82 | 39.2 | 17.1 | 0.844 |
| II | 78 | 60% | 2.3 | 60.4 | 46.8 | 1.587 |
| III | 150 | 40% | 3.5 | 94.9 | 60.0 | 2.571 |

The $MI_1$ material index is calculated by $\sigma*\Theta^{0.5}$ shown in the table. The $MI_2$ material index is calculated by $\sigma*\Theta$ shown in the table. The $MI_3$ material index is calculated by $\sigma^2*\Theta/E_p$ shown in the table. The properties of Precursor Composition I coating were measured by ASTM D882-02. The properties of Precursor Compositions II and III are as reported by the supplier. The material index can be used to rank the resulting composite fracture toughness. As will be shown in the following Example 5, Precursor Composition III Polymer has the highest $MI_1$, and correspondingly generated a glass article having the highest effective fracture toughness.

Coating Method

In the following examples, glass articles were made from substrates having a dimension of 20W×40L×0.7T mm, each of which was coated on one side at room temperature (e.g. 20-40° C.) with one of the precursor compositions.

For a coating of greater than or equal to 5 micrometers, the precursor composition was cast at room temperature (20-40° C.) by using a doctor blade, utilizing a gap ranging from about 5 mil. Thereafter, the samples were thermally cured in an oven (in air) at 300° C. for 1 hour.

For thin coatings of less than 5 micrometers, NMP was further added to the precursor solution to form a diluted solution for application. The glass substrate was heated to 300-400° C. before application of the solution. The diluted solution was applied by spraying with use of an air brush under a pressure of 15-30 psi. In-situ curing occurred for 5-15 minutes at 300-400° C.

Examples 1-3 and Comparative Examples A-C

Glass articles were formed according to the materials described in Table 2 below. Comparative examples were uncoated.

TABLE 2

| Example | Glass Composition | Precursor Composition |
|---|---|---|
| A comparative | A | none |
| 1 | A | I |
| B comparative | B | none |
| 2 | B | I |
| C comparative | C | none |
| 3 | C | III* |

*25 wt. % in NMP

The glass articles including a coating according to Table 2 were analyzed for effective fracture toughness ($K_C$) by the Double Torsion (DT) method defined herein at room temperature, and for average coating thickness ($t_c$) measured by a profilometer. The results, which reflect an average of 5 samples tested per example, are in Table 3.

TABLE 3

| Example | Coating thickness (micrometers) | Fracture Toughness Kc MPa * $m^{0.5}$ | Improvement |
|---|---|---|---|
| A comparative | — | 0.84 | — |
| 1 | 9.4 | 1.97 | 136% |
| B comparative | — | 0.79 | — |
| 2 | 7.4 | 1.91 | 142% |
| C comparative | — | 0.599 | — |
| 3 | 12.5 | 2.99 | 400% |

Figure 4:
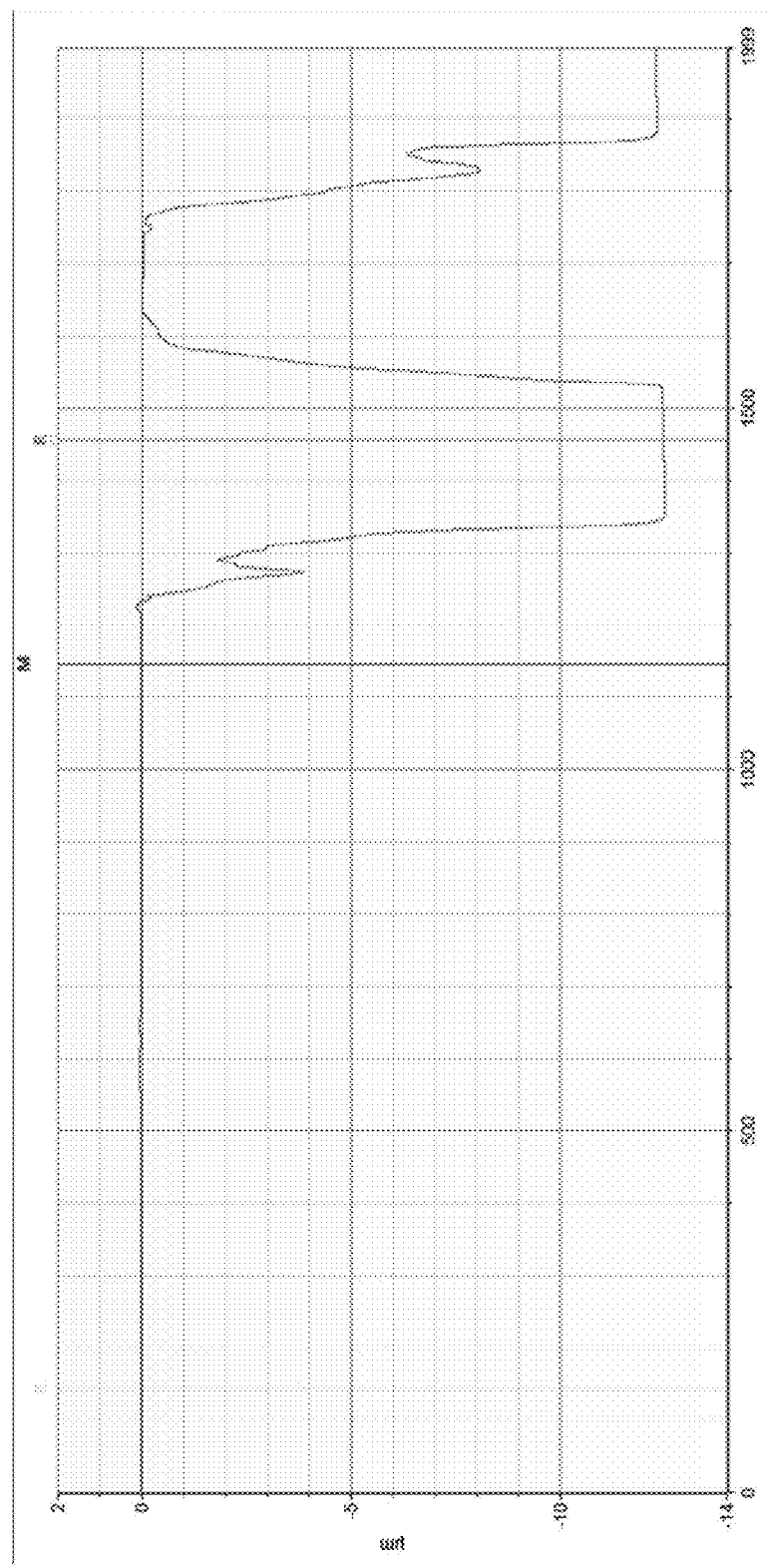
FIG. 4 is a profilometer thickness profile for an exemplary polymer coating.

FIG. 4 shows the profilometer scan for Example 3. More specifically, the Y axis shows depth from the surface of the coated sample (Y=0 is the surface of the coated sample, i.e., the coating surface), whereas the X axis shows distance across the width of the sample. Prior to making this scan, a portion of the coating was removed, down to the surface of the substrate at and around the distance "R" across the width of the sample. The profilometer scan then shows that the surface of the substrate is at a distance of about 12.5 micrometers from the surface (Y=0) of the coated sample, whereby the coating thickness is determined to be about 12.5 micrometers.

Examples 4-6

Examples 4-6 show the impact of polyimide coating with different mechanical properties as described in Table 1 on the effective fracture toughness of the resulting glass articles. Table 4 summarizes the glass composition and precursor compositions.

TABLE 4

| Example | Glass Composition | Precursor Composition |
|---|---|---|
| 4 | C | I** |
| 5 | C | II |
| 6 | C | III |

**dilutions of 1-7.5 wt. % concentration in NMP were used to make thinner coatings.

Figure 5:
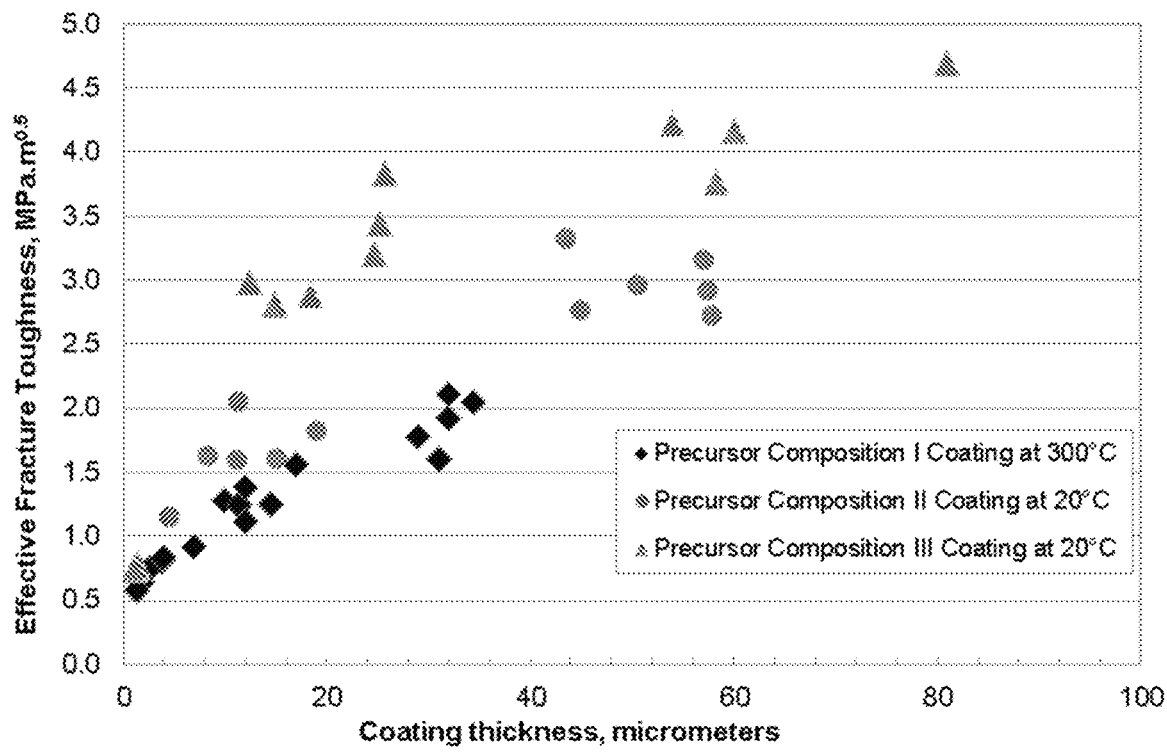
FIG. 5 is effective fracture toughness ($K_C$) MPa*m$^{0.5}$ by the Double Torsion (DT) method as a function of coating thickness (micrometers) by profilometer for several embodiments.

Glass articles were forming having polymer coatings of various thicknesses. In FIG. 5, effective fracture toughness ($K_C$) MPa*$m^{0.5}$ by the Double Torsion (DT) method as a function of coating thickness (micrometers) by profilometer is shown. For Example 4, the DT method was conducted at 300° C. For Examples 5-6, DT was conducted at room temperature (e.g., 20° C.-40° C.). Effective fracture toughness measured at 300° C. is slightly lower than what it would be at room temperature. Effective fracture toughness increases with increasing coating thickness for all three materials, as predicted by the mechanical model.

The glass articles of Glass Composition C and polymer delivered by Precursor Composition III showed the best effective fracture toughness. For example, at a coating thickness of 57 micrometers, the effective fracture toughness ($K_C$) at room temperature was 4.05 MPa*m$^{0.5}$ and at a thickness of 81 micrometers, the effective fracture toughness ($K_C$) at room temperature was 4.7 MPa*m$^{0.5}$ Example 7

Modeling

The experimental data for Example 4 were compared with the following model for the polymer of Precursor Composition I:

$$K_c = K_g * (1 + \alpha \beta^2 / \gamma)^{0.5}$$

wherein $K_g$ is a glass composition-based fracture toughness at a temperature, α is the ratio of coating thickness ($t_c$) to glass-based substrate thickness ($t_s$), β the ratio of $K_m$ to $K_g$; and γ is the ratio of Young's Modulus of the polymer ($E_p$) to Young's Modulus of the glass ($E_g$).

The comparison of $K_C$ versus coating thickness (micrometers) for experimental and modeled fracture toughness of Examples 4-6 is shown in FIG. 6, which includes the data of FIG. 5. In FIG. 6, "Comp 1" denotes Precursor Composition I, "Comp 2" denotes Precursor Composition II, and "Comp 3" denotes Precursor Composition III. $E_g$ was 65 GPa for Examples 4-6. $K_g$ was 0.5 MPa*m$^{0.5}$ and $K_m$ was 1.45 MPa*m$^{0.5}$ for Example 4. $K_g$ was 0.599 MPa*m$^{0.5}$ and $K_m$ was 2.35 MPa*m$^{0.5}$ for Example 5. $K_g$ was 0.599 MPa*m$^{0.5}$ and $K_m$ was 4.23 MPa*m$^{0.5}$ for Example 6.

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass-based article comprising:
a glass-based substrate comprising opposing first and second surfaces defining a substrate thickness ($t_s$), a substantially planar central portion, and a perimeter portion;
a polymer coating disposed on at least a portion of at least one of the first or the second surfaces; and
an effective fracture toughness that is greater than or equal to 1.25 MPa·m$^{0.5}$ as measured at room temperature.

2. The glass-based article of claim 1, wherein the perimeter portion comprises finished edges.

3. The glass-based article of claim 1, wherein an average thickness of the polymer coating ($t_c$) is greater than or equal to 5 micrometers and/or is less than or equal to 150 micrometers, and wherein $t_s$ is greater than or equal to 0.02 mm and less than or equal to 1.3 mm.

4. The glass-based article of claim 1, wherein the polymer coating comprises a polymer comprising a first material index (MI$_1$) as defined by MI$_1$=θ$^{0.5}$σ$_y$, wherein θ is elongation of the polymer in percentage and σ$_y$ is tensile strength of the polymer in MPa, where MI$_1$ is greater than or equal to 35 MPa and/or less than or equal to 100 MPa.

5. The glass-based article of claim 4, wherein the polymer coating comprises a polymer comprising a second material index (MI$_2$) as defined by MI$_2$=θσ$_y$, wherein θ is elongation of the polymer in percentage and σ$_y$ is tensile strength of the polymer in MPa, where MI$_2$ is greater than or equal to 12 MPa and/or less than or equal to 75 MPa.

6. The glass-based article of claim 5, wherein the polymer coating comprises a polymer comprising a third material index (MI$_3$) as defined by MI$_3$=θσ$_y^2$/E, where θ is elongation, σ$_y$ is the tensile strength in MPa, and E is the Young's Modulus in GPa, the range of MI$_3$ being greater than or equal to 0.5 MPa and/or less than or equal to 5 MPa.

7. The glass-based article of claim 1, wherein the polymer coating comprises a polymer selected from the group consisting of: polyimides, polyamides, polysulfones, polybenzimidazoles, silicones, epoxies, acrylates, and combinations thereof.

8. The glass-based article of claim 1, wherein the glass-based substrate comprises in mole percent: greater than or equal to 55% to less than or equal to 70% SiO$_2$, and greater than or equal to 10% to less than or equal to 20% Al$_2$O$_3$.

9. The glass-based article of claim 8, wherein the glass-based substrate comprises in mole percent: 55 to 70% SiO$_2$, 10 to 20% Al$_2$O$_3$, 0 to 7% P$_2$O$_5$, 0 to 20% Li$_2$O, and 0 to 20% Na$_2$O.

10. A consumer electronic product comprising:
a housing comprising a front surface, a back surface, and side surfaces;
electrical components at least partially within the housing, the electrical components comprising at least a controller, a memory, and a display, the display at or adjacent the front surface of the housing; and
a cover disposed over the display;
wherein a portion of at least one of the housing and the cover comprises the glass-based article of claim 1.

11. A process for making a glass-based article based in part on mechanical modeling, the glass-based article comprising an effective fracture toughness ($K_C$), the process comprising:
disposing a polymer precursor on at least a portion of at least one of first and second surfaces of a glass-based substrate that comprises: a substrate thickness ($t_s$) defined by the first and second surfaces, a glass composition-based fracture toughness ($K_g$), wherein the polymer precursor delivers a polymer comprising a tensile strength σ$_y$ in MPa; and
curing the polymer precursor to form a polymer coating comprising an average coating thickness ($t_c$) on the glass-based substrate to form a glass-based article;
wherein the $K_C$ is defined by:

$$K_c = K_g * (1 + \alpha \beta^2 / \gamma)^{0.5} \quad (I),$$

wherein α is the ratio of coating thickness ($t_c$) to glass-based substrate thickness ($t_s$), β is the ratio of $K_m$ to $K_g$, γ is the ratio of Young's Modulus of the polymer ($E_p$) to Young's Modulus of the glass ($E_g$), and $K_m$ is a value of greater than or equal to 0.45 MPa*m$^{0.5}$ to less than or equal to 10 MPa*m$^{0.5}$.

12. The process of claim 11, wherein the glass-based article comprises an effective fracture toughness that is greater than or equal to 1.25 MPa·m$^{0.5}$ as measured at room temperature, and wherein the average coating thickness ($t_c$) is greater than or equal to 5 micrometers and/or is less than or equal to 150 micrometers.

13. The process of claim 11, wherein the polymer precursor delivers a polymer comprising a first material index ($MI_1$) as defined by $MI_1=\theta^{0.5}\sigma_y$, wherein $\theta$ is elongation and the $\sigma_y$ is the tensile strength in MPa, the range of $MI_1$ being greater than or equal to 35 MPa and/or less than or equal to 100 MPa.

14. The process of claim 13, wherein the polymer precursor delivers a polymer comprising a second material index ($MI_2$) as defined by $MI_2=\theta\sigma_y$, wherein $\theta$ is elongation of the polymer in percentage and $\sigma_y$ is tensile strength of the polymer in MPa, where $MI_2$ is greater than or equal to 12 MPa and/or less than or equal to 75 MPa.

15. The process of claim 14, wherein the polymer precursor delivers a polymer comprising a third material index ($MI_3$) as defined by $MI_3=\theta\sigma_y^2/E$, where $\theta$ is elongation, $\sigma_y$ is the tensile strength in MPa, and E is the Young's Modulus in GPa, the range of $MI_3$ being greater than or equal to 0.5 MPa and/or less than or equal to 5 MPa.

16. A method of manufacturing a glass-based article comprising:
disposing a polymer precursor on at least a portion of at least one of first and second surfaces of a glass-based substrate that comprises: a substrate thickness ($t_s$) defined by the first and second surfaces, a substantially planar central portion, and a perimeter portion; and
curing the polymer precursor to form a polymer coating on the glass-based substrate to form a glass-based article comprising an effective fracture toughness that is greater than or equal to 1.25 MPa·m$^{0.5}$ as measured at room temperature.

17. The method of claim 16, wherein the curing is conducted at a temperature of greater than or equal to 300° C., and wherein applying the polymer precursor comprises applying a solution comprising at least one monomer and at least one solvent.

18. The method of claim 16, wherein applying the polymer coating comprises spreading by a doctor blade.

19. The method of claim 16, wherein the polymer coating comprises a polymer selected from the group consisting of: polyimides, polyamides, polysulfones, polybenzimidazoles, silicones, epoxies, acrylates, and combinations thereof.

20. The method of one of claim 16, wherein an average thickness of the polymer coating ($t_c$) is greater than or equal to 5 micrometers and/or is less than or equal to 150 micrometers.

* * * * *